2,795,040

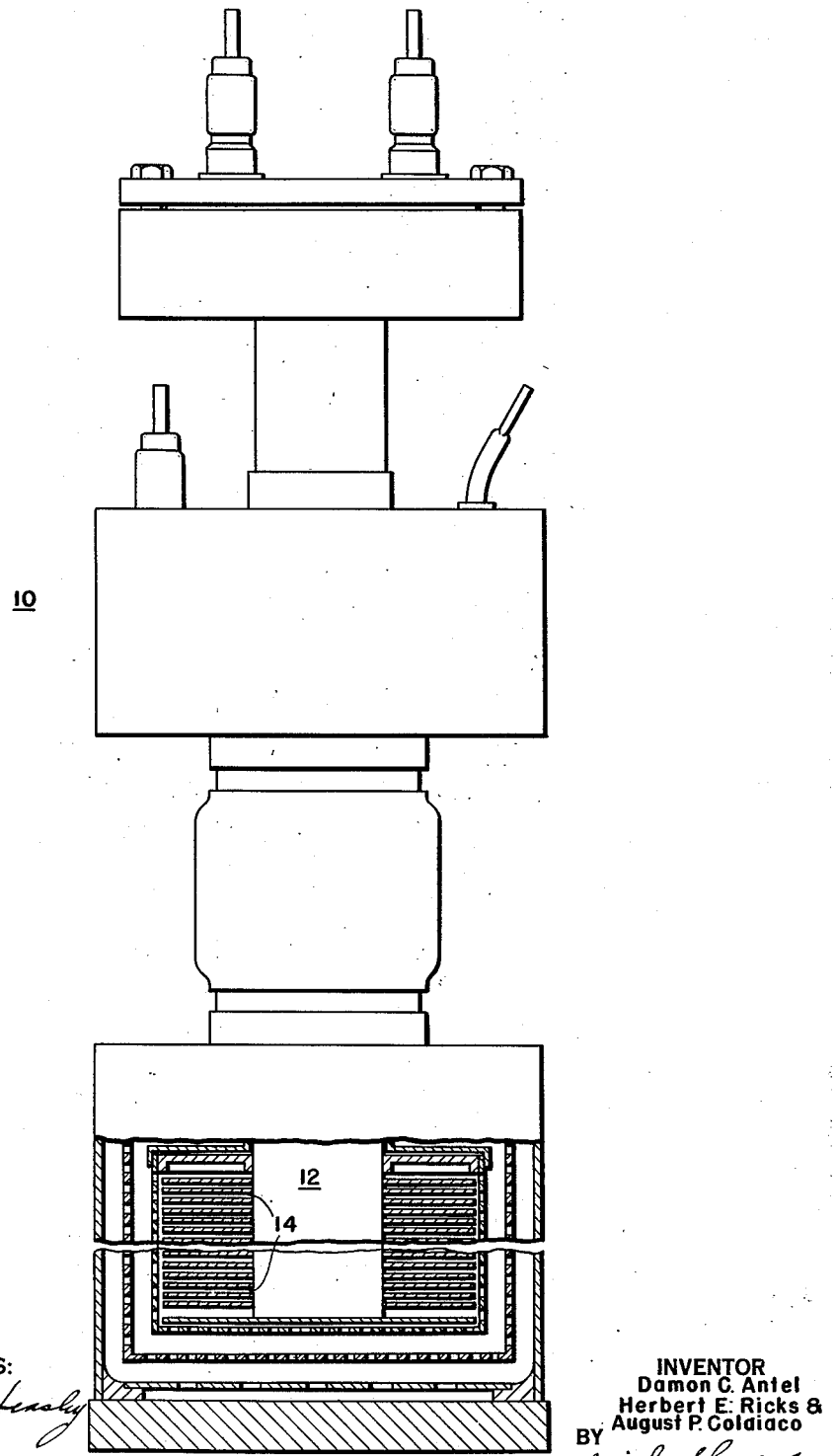

Patented June 11, 1957

2,795,040

JOINING METALS HAVING HIGH TEMPERATURE MELTING POINTS

Damon C. Antel, Trafford, and Herbert E. Ricks and August P. Colaiaco, Pittsburgh, Pa., assignors to Westinghouse Electric Corporation, East Pittsburgh, Pa., a corporation of Pennsylvania Application August 20, 1953, Serial No. 375,518

5 Claims. (Cl. 29—494)

This invention relates to the joining of metal members having a high temperature melting point by means of a metal bond also having a high temperature melting point. More particularly, the invention relates to the joining of metals having a melting point higher than 1400° C. with a metal bond comprising either nickel or cobalt, or a nickel-cobalt alloy.

In the art of producing vapor-electric devices or tubes using an alkali vaporizable discharge-metal, and high temperature melting point metals, it is the practice to provide a finned construction for the cathode which is usually nickel. The finned construction provides a much larger electron-emitting surface-area than could otherwise be provided by any single cylinder or any single flat piece of metal. The cathode tube is provided with its electron emitting fins by mounting axially spaced apart washers on the tube. It is a simple matter to position the washers on the cathode tube, but to date, to the best of applicants' knowledge, there has been no means for satisfactorily anchoring the washers to the tube. Heating the assembly to the melting point of the nickel (1452° C.) was found unsatisfactory since the structure was distorted by such treatment. Welding the fins or washers to the cathode tube was tried but this proved unsatisfactory because the welding distorted the relatively thin washers. Brazing or soldering with ordinary solders and silver brazing alloys could not be used because of the introduction of metals having a low temperature melting point.

An object of this invention is to provide a method of joining metal members having a high temperature melting point by means of a metal bond having a similar high temperature melting point.

A further object of this invention is to provide a method of joining metal members having a high temperature melting point by depositing a metal phosphide coating by either a chemical reduction or electrodeposition process at the joints of the members and then heating the members to drive the phosphorus from the phosphide thereby producing a substantially phosphorus-free metal bond joining the members.

Other objects of the invention will in part be obvious or will in part appear hereinafter.

For a better understanding of the nature and objects of the invention reference should be had to the following detailed description and drawing, in which the sole figure is a frontal elevation, partly in section, of a vapor-electric tube.

It has been discovered that metal members having a melting point greater than 1400° C. may be satisfactorily joined by a novel method of forming at the joints thereof a metal bond, the metal of the metal bond having a similar high temperature melting point. This is accomplished by depositing on the members to be jointed a metal phosphide coating of a metal selected from at least one of the group consisting of cobalt and nickel, and then heating the members so that the coating melts and substantially all of the phosphorus is driven off. While the coating is melted, the metal flows around the joint to form a metal bond permanently joining the members. It is to be understood that the coating may be deposited initially, prior to heating, on only one of the members to be joined or on each of the members. On heating the metal phosphide will spread to the other members to be joined at the area of the joint. Also, the coating may be deposited before heating only at the area where the joint is to be formed, or it may completely cover the members. Ordinarily, a better joint is produced when the coating is deposited on each of the members that are to be joined.

The metal phosphide coating may be deposited on the members to be joined by a chemical reduction process often referred to as "electroless plating" which will be hereinafter described. If desired, the metal phosphide coating may also be deposited by a well known method of passing an electrical current through a phosphite plating bath. This is done for reasons of economy when the members to be coated are of uniform configuration and an even deposit may be plated thereon.

The members with the metal phosphide deposited thereon are placed in contact with one another in the position in which they are to be joined and heated at a temperature of from 800° C. to 1400° C. for a period of time sufficient to cause the coating to melt and flow whereupon a high proportion or substantially all of the phosphorus is driven from the phosphide coating and a substantially phosphorus-free metal bond is produced. The heating may be for a period of time of from five minutes to two hours or more. The longer times and higher temperatures result in less phosphorus being present in the applied nickel or cobalt deposit.

The metal of the phosphide coating may be either cobalt or nickel or an alloy of the two. One method of depositing the coating by chemical reduction or electroless plating is described in the November 1947 issue of the Journal of Research of the National Bureau of Standards in an article entitled "Deposition of nickel and cobalt by chemical reduction." Briefly, one such immersion solution comprises 30 grams of nickel chloride hexahydrate, 50 grams of ammonium chloride and 100 grams of sodium citrate per liter of solution, the balance being water. There is then added sufficient ammonium hydroxide to render the solution alkaline to a pH of from 8 to 10. When immersion plating is to be accomplished therein, the solution is heated to a temperature of from 190 to 200° F. and then 10 grams of sodium hypophosphite is added to each liter of solution. For every hour that plating is carried out in the solution, sodium hypophosphite is added to the bath at the rate of 5 grams per liter. This plating bath will build up a coating at the rate of 0.0003 inch per hour. The phosphorus comprises less than 15% of the weight of the metal phosphide coating. It will be appreciated that cobalt salts may be substituted in whole or in part for the nickel salts in this immersion bath.

The following example is exemplary of the practice of this invention.

Example I

Illustrated in the single figure of the drawing is a vapor electric tube 10 of the type described in copending application, Serial No. 144,354, filed February 15, 1950, now Patent No. 2,663,824, and assigned to the same assignee as this application. A nickel cathode tube 12 was provided with an electron emitting surface comprising spaced apart washers or fins 14 also of nickel. The end of the cathode tube 12, on which the electron emitting surface member is to be attached together with washers 14, was immersed in an electroless plating bath of the type described hereinbefore and a coating having a thickness of 0.003 inch of nickel phosphide was deposited on the cathode tube 12 during a period of time of ten hours. The washers 14 were placed on the tube 12 and the assembly was heated at a temperature of 1100° C. in a hydrogen atmosphere for a period of time of two hours after which time it was cooled to 600° C. and then removed from the protective hydrogen atmosphere. During the heating, the phosphide coating melted and spread upon the contacting surfaces of the washers 14, and a substantial amount of the phosphorus was driven from the nickel phosphide thereby producing a low phosphorus content nickel bond, less than 1% P, securely joining the washers 14 to the tube 12. The melting of the coating smoothed out all rough spots that occurred therein during the assembly of the washers 14 on the cathode tube 12.

The process of Example I can be carried out by first electroplating the nickel phosphide thereon. Also cobalt phosphide bonding coating may be applied and heat-treated similarly.

Exemplary of the formulation of a suitable aqueous electroplating electrolyte is one having from 25 to 35 ounces per gallon of nickel sulphate, from 6 to 9 ounces per gallon of nickel chloride hexahydrate, from 3 to 5 ounces of boric acid and from 4 to 6 ounces per gallon of nickel phosphite. Good results have been secured in plating at current densities from 5 to 50 a. s. f. The pH of the electrolytes may vary from about 0.5 to 2 while the temperature of the electrolyte may vary from about 65° C. to 85° C.

If desired the phosphorus content of the metal bond may be further reduced by additional heating in the temperature range of 800° C. to 1400° C. In one case, an additional heating of the assembly for five minutes at 1300° C. further reduced the phosphorus content of the metal phosphide by one-half from that present after the initial two hours heating at 1100° C.

It is to be understood that other metals or alloys thereof having high temperature melting points may be joined by the novel method taught by this invention. For example, tungsten and molybdenum members have been as satisfactorily joined together as the nickel members.

It should be understood that the description and drawing are illustrative of the invention and not in limitation thereof.

We claim as our invention:

1. In the process of joining metal members having a melting point greater than 1400° C., the steps comprising depositing from an aqueous solution a uniform thin metal phosphide coating of a metal selected from at least one of the group consisting of cobalt and nickel on at least one of the members in the area where the members are to be joined, the phosphorus comprising less than 15% of the weight of the metal phosphide, and heating the members at a temperature of from 800° C. to 1400° C. in a protective atmosphere for a period of time sufficient to cause the coating to flow, and while the members are in contact with one another in the position in which they are to be joined, the heating in the protective atmosphere being continued for a period of time to drive off substantially all of the phosphorus from the phosphide thereby joining the members with a metal bond having a low phosphorus content and of a much higher melting point.

2. The process of claim 1 in which the joined members are further heated at a temperature of from 1300° C. to 1400° C. in the protective to further reduce the phosphorus content of the metal bond.

3. An article of manufacture comprising bonded metal members produced by the process of claim 1.

4. In the process of joining nickel members with a nickel bond, the steps comprising depositing from an aqueous solution a uniform thin nickel phosphide coating on each of the members in the area where the members are to be joined, the phosphorus comprising less than 15% of the weight of the nickel phosphide, and heating the members at a temperature of from 800° C. to 1400° C. in a hydrogen atmosphere for a period of time sufficient to cause the coating to flow and while the members are in contact with one another in the position in which they are to be joined, the heating in hydrogen is continued to drive off substantially all of the phosphorus thereby joining the members with a nickel bond having a low phosphorus content and a high melting point.

5. An article of manufacture comprising bonded nickel members produced by the process of claim 4.

References Cited in the file of this patent

UNITED STATES PATENTS

| | | |
|---|---|---|
| 1,651,709 | Jones | Dec. 6, 1927 |
| 2,195,314 | Lincoln | Mar. 26, 1940 |
| 2,200,742 | Hardy | May 14, 1940 |
| 2,645,006 | Hadley | July 14, 1953 |
| 2,652,621 | Nelson | Sept. 22, 1953 |

FOREIGN PATENTS

| | | |
|---|---|---|
| 487,263 | Great Britain | July 17, 1938 |